United States Patent Office 3,240,562
Patented Mar. 15, 1966

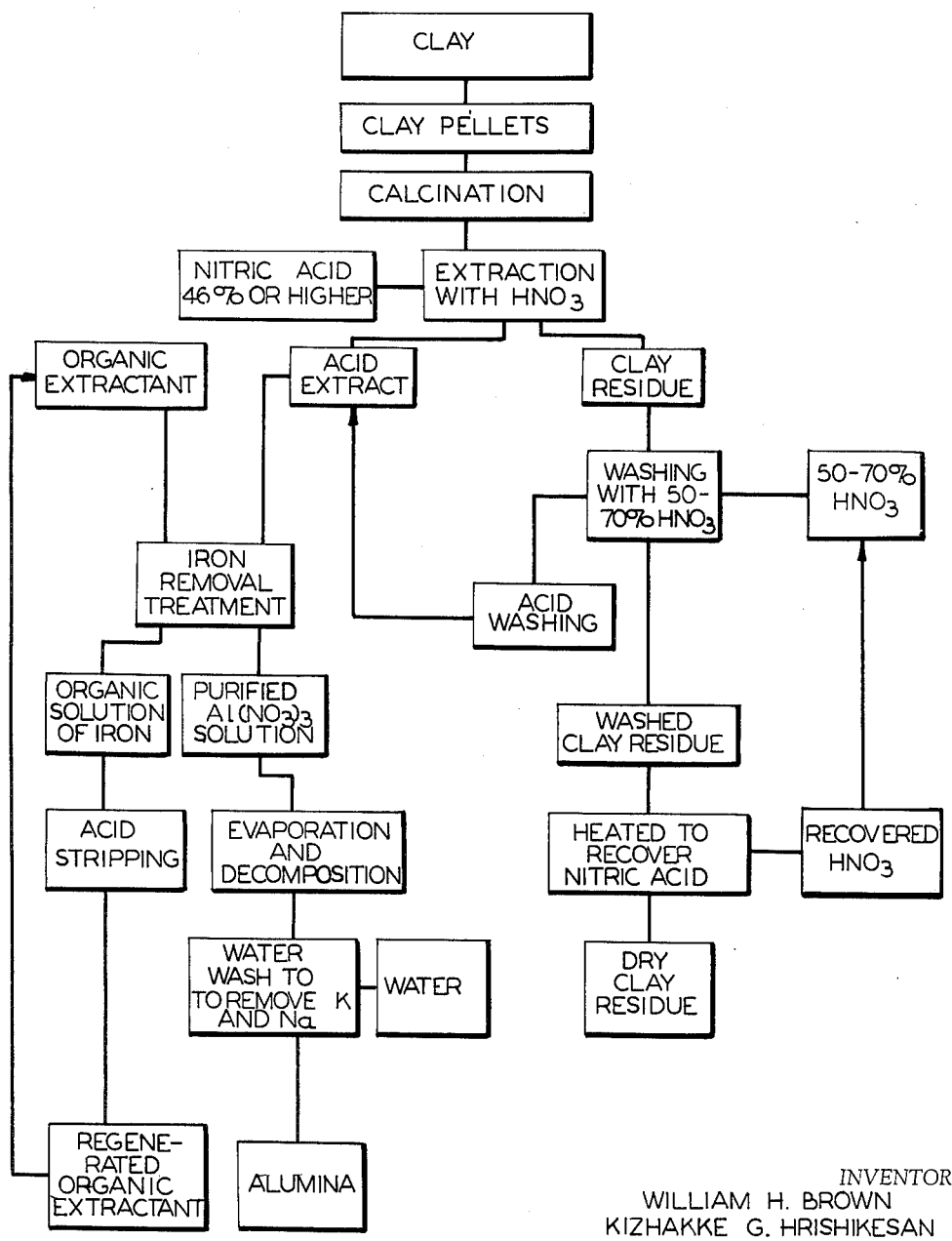

3,240,562
PROCESS FOR THE PRODUCTION OF
ALUMINA
William H. Brown and Kizhakke G. Hrishikesan, Little Rock, Ark., assignors to Reynolds Metals Company, Richmond, Va., a corporation of Delaware
Filed June 4, 1962, Ser. No. 199,948
12 Claims. (Cl. 23—143)

This invention relates to a novel method for the production of alumina of high purity from aluminous raw materials by extraction with nitric acid. More particularly, the invention concerns a method for the extraction of alumina from clay in high yield and having a very low content of silica and iron.

Almost all the high purity alumina required for the production of aluminum metal is currently manufactured by the well-known Bayer process, utilizing high grade bauxite ores as raw materials. The supply of such bauxites is limited and hence it is necessary to rely to some extent on lower grades of domestic bauxites which are greater in silica, and possibly also in iron content than the high grade ores. If the bauxite contains more than about 7% silica, it becomes uneconomical to process the ore by means of the conventional Bayer treatment because of loss of soda and alumina as an insoluble sodium aluminum silicate compounds. Therefore, in order to utilize high silica domestic bauxite, producers have employed a combination process in which the residue from the Bayer plant is sintered with calcium carbonate and soda ash to produce a soluble sodium aluminate and an insoluble dicalcium silicate. However, both the regular or combination Bayer process (Bayer-sinter process) are still dependent upon bauxite ores, the reserves of which are limited in comparison with aluminous raw materials such as clay, which occur in extensive deposits within the continental United States. The supply of good grades of foreign bauxite is also restricted and subject to possible interruption.

Numerous efforts have been made in the prior art to utilize low value aluminous raw materials and to recover alumina therefrom by extraction with mineral acids to dissolve the aluminum present and to separate it from the siliceous components. None of these prior art methods has been successful in producing economically an alumina sufficiently low in silica and iron to meet the purity standards presently attainable by Bayer process alumina.

In accordance with the present invention, there is provided a novel method for the extraction of aluminous raw materials, particularly clays, to obtain alumina of high purity and yield, having a silica content even lower than that of conventional Bayer process alumina. This alumina is excellently suited to be employed directly in reduction cells for production of aluminum metal. The novel method of the invention permits an alumina recovery of 97% and higher, while at the same time providing economical control of silica, iron and potash in the extraction system and in the final alumina product.

The alumina obtainable by the method of the invention is readily capable of meeting or exceeding the following specifications for Bayer process alumina:

| | Percent |
|---|---|
| $SiO_2$ (maximum) | 0.02 |
| $Fe_2O_3$ | 0.03 |
| $K_2O$ | 0.02 |
| $Na_2O$ | 0.50 |
| $TiO_2$ | 0.02 |

INTRODUCTION

The essential steps in the method of the invention include calcination of the aluminous raw material (clay), extraction of the calcined clay with nitric acid having a concentration of a least 46%, separation of the nitric acid extract, and recovery of the alumina from the extract, in which it is present in the form of aluminum nitrate. It has been found that by control of the concentration of the nitric acid used in the digestion of the calcined clay, and by control of the calcination temperature of the clay, the amount of silica entering the acid extract can be held to a minimum.

The clay extraction residue contains a certain amount of entrained acid liquor, recovery of which is essential to the economical practice of the extraction. In accordance with the invention, it has been found that the manner in which this entrained acid liquor is recovered is of critical importance in the control of the silica content of the final alumina.

Accordingly, in a preferred embodiment of the invention, the clay extraction residue is washed with concentrated nitric acid to displace entrained nitric acid and aluminum nitrate, and the washings are combined with the main body of the nitric acid extract. The washed residue is then heated at a temperature above the boiling point of the nitric acid used for washing, in order to recover contained nitric acid. The nitric acid thus recovered may be recycle for reuse in subsequent washing operations.

The residue from the foregoing procedure is a highly siliceous product which possesses moisture absorption properties and which may be utilized as a desiccant.

In known methods for the extraction of clay with nitric acid, the insoluble silceous residue from the extraction step is separated by filtration and washed with water, and these water washings are added to the original extract or filtrate. Experience has shown that this conventional procedure results in a fairly high contamination of the alumina with silica, sufficient to render the alumina unsuitable as reduction cell feed material, for which the silica limit is 0.02% or less. Moreover, if the water washings are added to the original nitric acid extract, the alumina obtained therefrom contains from 0.08% to 0.09% silica regardless of the concentration of nitric acid used in the digestion of the clay.

In accordance with the present invention, it was found, surprisingly and unexpectedly, that the silica content of the nitric acid (aluminum nitrate) extract is directly related to the concentration of nitric acid. When nitric acid of a concentration of 46% or higher, by weight, is employed for extraction of the aluminous raw material such as clay, the tendency of silica to dissolve in the nitric acid is reduced to a minimum. Furthermore, by employing concentrated nitric acid, having a concentration between about 50% and about 70%, for washing the extraction residue, the pick-up of silica by the washing acid is also held to a minimum. Therefore the washing acid can be combined with the original strong nitric acid extract with no deleterious effect on the silica content of the final alumina.

As mentioned previously, the silica content of the aluminum nitrate extract liquor is directly related to the nitric acid concentration used for extrcation, with an acceptable alumina being proudced only when an acid concentration of 46% $HNO_3$ or higher is employed, i.e. 0.02% silica or less. The following table illustrates the effect of nitric acid concentration on the silica content of the alumina obtained, using various nitric acid concentrations for extraction:

Table 1

EFFECT OF ACID CONCENTRATION ON SILICA CONTENT OF ALUMINA

| Acid concentration (percent $HNO_3$) | Silica content of alumina (percent $SiO_2$ on an $Al_2O_3$ basis) |
|---|---|
| 35 | 0.08 |
| 43 | 0.03 |
| 50.5 | 0.014 |
| 62 | 0.013 |

The unexpected discovery was also made that if the washing of the siliceous residues is done with nitric acid of a concentration higher than about 50% $HNO_3$, the washings could be added to the original acid extract with no appreciable increase in silica contamination of the alumina. Thus, it is possible to wash the residue with, for example, 70% $HNO_3$ and to include the washings with the original acid extract to produce an alumina containing only 0.014% $SiO_2$.

The reason for the unexpected reduction in silica content by increasing the nitric acid concentration is not clearly understood, but without being bound by any particular theory, a possible explanation is that at higher acid concentrations the silicic acid present becomes dehydrated precipitating silica back upon the siliceous residue. Thus, upon washing the residue with water instead of strong $HNO_3$, the soluble silicic acid is reformed and then if the water washings are combined with the acid extract, silica contamination of the alumina rises to unacceptable levels.

PREPARATION OF RAW MATERIAL

In accordance with the invention, it has also been found that control of the silica content of the obtained alumina is achieved by proper conditioning of the aluminous raw material prior to the nitric acid extraction.

For purposes of illustration of the invention, clay will be utilized herein as a representative aluminous raw material. A typical clay of this type, and which is the material referred to in the ensuing discussion and examples, is a Georgia kaolinitc clay having the following analysis:

| | Percent |
|---|---|
| $SiO_2$ | 44.2 |
| $Al_2O_3$ | 37.4 |
| $Fe_2O_3$ | 2.8 |
| $TiO$ | 1.5 |
| $P_2O_5$ | .04 |
| $Na_2O$ | .035 |
| $K_2O$ | .10 |
| $CaO$ | trace |
| Loss on ignition | 13.5 |

The preferred practice of the invention requires that the clay be calcined prior to extraction. In the calcination step the clay is dehydrated and the alumina becomes loosely bonded to the silica, both these components being in an amorphous state, thereby facilitating extraction. The calcination time and temperature may vary widely depending upon the type of clay used as the raw material. About 700° C. has been found to be the minimum by which silica control at or below the 0.02% level can be achieved and maintained. As the calcination temperature is increased, further lowering of the silica content of the alumina is attained, but about 800° C. appears to be a practical maximum, because optimum extraction occurs at or near this calcination temperature. Prolonged calcination at a higher temperature, such as 1000° C., causes the alumina to combine with silica to form mullite or other phases, thereby greatly diminishing the solubility of the alumina in nitric acid. On the other hand, if the clay is not calcined at all, the solubility of the alumina in the nitric acid is low and the insoluble residue is difficult to filter. Hence for each type of aluminous raw material there is an optimum calcination time and temperature which renders the alumina most readily soluble in strong nitric acid. The time may vary widely, but in general, a calcination time of about ½ to 2 hours is sufficient. The calcination temperature range is advantageously from about 650° to about 850° C., and preferably between about 700° and 800° C.

The physical state of the clay prior to calcination is also of significance. Preferably the clay is pelletized prior to calcination. Uncalcined clay was found to be easily pelletized with water, no binder or wetting agents being required. The pellets thus formed (spheres or cubes) hold their shape during calcination and extraction. Although slightly higher extractions may be obtained from finely pulverized clay calcines than from pelletized clay calcines, the latter form is preferred to facilitate the separation of extracted liquor from the residue. A pellet size of about 1/16" has been found to be advantageous for extraction purposes.

EXTRACTION STEP

The extraction of the pelletized, calcined clay is carried out, in accordance with the invention, with nitric acid having a concentration of at least 46% $HNO_3$, and advantageously ranging from about 46% to about 70%. The preferred $HNO_3$ concentration for extraction is 50.5%, as is has been found that this concentration results in adequate silica control and has the proper amount of water present after extraction to form the stable aluminum nitrate nonahydrate, which facilitates subsequent crystallization. The digestion can be carried out under atmospheric, subatmospheric, or superatmospheric pressure. The temperature of digestion is preferably approximately the boiling point of the nitric acid solution at the pressure used for digestion. At atmospheric pressure, an extraction temperature between about 115° and about 130° C. is satisfactory. The time of digestion depends upon the particle or pellet size of the clay; generally from about ½ to 2 hours is sufficient. In general, the stoichiometric quantity of nitric acid, based on analysis of the clay, may be employed, or a slight excess over stoichiometric. Thus, for example, one may advantageously employ a ratio of 1.12 of nitric acid to stoichiometric alumina present in the clay. The extraction may be carried out in any suitable type of equipment, such as a series of towers in which the nitric acid flows countercurrent through beds of pelletized clay. Where nitric acid is used for washing the extraction residue, it will be combined with the main body of nitric acid in the extraction towers.

The high extraction and recovery values for alumina, expressed as percent of the alumina in the unextracted or original clay calcine, which are obtained in accordance with the novel method of the invention are illustrated by the data in the following table. These data are based upon a clay as previously indicated, calcined for 1 hour at 800° C. in the form of 1/16" pellets, having a composition including 42.8% $Al_2O_3$, 50.7% $SiO_2$, and 3.05% $Fe_2O_3$, using 50.5% $HNO_3$ as the extraction acid and 1 to 3 extraction cycles, for 30 minutes, at a temperature of 123°–130° C.:

*Table 2*

EXTRACTION AND RECOVERY OF ALUMINA

| Calcination temp., ° C. | Extraction cycle | Extraction, percent | Alumina recovery, percent | Silica content, percent |
|---|---|---|---|---|
| 800 | 1 | 70 | 55 | .012 |
|  | 2 | 92 | 86 | .014 |
|  | 3 | 99 | 97 | .020 |

Where concentrated nitric acid is used for washing the clay residue, the concentration is preferably 50.5% $HNO_3$ or higher, advantageously from about 50.5% to about 70% $HNO_3$. It has been found that if the acid concentration used is that of a constant-boiling mixture of nitric acid and water, e.g. 68% $HNO_3$, there is the added advantage that this strength acid can be recovered from the siliceous residue by simply heating the residue to the boiling point of the acid and condensing the acid vapors, and recycling the condensed acid for further use in washing. This permits recovery of acid values of as much as 97%. The adsorptive capacity of the siliceous residue is also increased by the use of strong washing acid, thereby imparting to the residue a desiccant value approaching that of activated alumina.

The extraction method of the invention may be better understood by reference to the accompanying flow-sheet illustrating the method, and the examples given below.

REMOVAL OF IRON

In accordance with prior art methods of extraction of aluminous raw materials with nitric acid, the acid extract containing aluminum nitrate, silica, and iron impurities in the form of ferric nitrate is crystallized to form aluminum nitrate nonahydrate, $Al(NO_3)_3$, $9H_2O$. The crystals of the latter are calcined to form alumina and nitric acid vapors, and the vapors are absorbed in water or condensed by known methods to nitric acid, which is recycled to the digestion steps. The alumina thus formed contains substantial amounts of silica and $Fe_2O_3$, and must be further processed by alkaline treatments to attain sufficient purity for use in reduction cells.

In accordance with a further aspect of the invention, the nitric acid extract which contains aluminum nitrate and which is already low in silica, is treated to remove the iron impurity which is present as ferric nitrate. The removal of iron is accomplished by the use of liquid-liquid extraction, employing an organic compound which is capable of forming a complex with the iron, in solution in a suitable organic solvent. The aqueous aluminum nitrate solution, substantially freed of its iron content, is separated. The organic solvent containing the organic iron complex is reacted with an acid, decomposing the iron complex to form the ferric salt of the acid and setting free the organic compound. The regenerated organic compound in solution in the organic solvent is recycled to the iron removal operation. It has been found that thereby the acid extract from clay digestion can undergo a reduction in its $Fe_2O_3$ content from about 1.5% to as little as 0.016% (based on the $Al_2O_3$ content) without any loss of alumina. The $Fe_2O_3$ content in alumina intended for reduction cell feed should be less than 0.03%.

The organic reagent for complexing the iron in the nitric acid extract is preferably a dialkyl ester of phosphoric acid, particularly a lower alkyl diester. The ester which has been found especially suitable for this purpose is di-(2-ethylhexyl)-phosphoric acid (di-2-ethylhexyl hydrogen orthophosphate). The organic solvent is preferably a low-boiling aliphatic hydrocarbon solvent, for example, n-octane or kerosene. The acid employed for stripping the iron from the organic iron complex is preferably a mineral acid, such as sulfuric acid or hydrochloric acid.

In accordance with the invention, it has been found that favorable results are obtained when there are employed for the treatment between about 3 and about 6 mols, and preferably between about 4 and 5 mols of the dialkyl phosphoric acid ester per mol of iron in the nitric acid liquor. The concentration of dialkyl phosphoric acid ester in organic solvent will be generally between about 15% and about 30% by weight. The time of contact between the acid liquor and extract solution may vary widely, but between about 2 and about 45 minutes is generally satisfactory, preferably about 10 minutes. Prolonged extraction times should be avoided since they may result in re-entry into the acid liquor of a portion of the extracted iron. Extraction temperatures may range from ambient temperature to near the boiling temperature of the organic solvent, but in general a temperature of about 60° C. is suitable.

The efficiency of extraction of the iron is affected by the phase ratio, i.e. the ratio of the volume of the organic liquid phase to the aqueous or acid liquid phase. If the ratio is too low, the phases are difficult to separate; if it is too large, the extraction efficiency is decreased. The ratio of organic phase to aqueous phase should be between about 0.5:1 and about 1:1, preferably about 0.6:1, the organic phase containing the dialkyl ester in the aforementioned proportions of about 3 to 6 mols per mol of iron in the aqueous phase.

The presence of free acid in the nitric acid extract tends to reduce the efficiency of iron extraction, but this can be compensated for by increasing the molar ratio of phosphoric acid ester to iron. Thus, when the free $HNO_3$ concentration in the aluminum nitrate extract is about 10%, the dialkyl ester used is in the order of 7 mols per mol of iron to obtain the same efficiency of iron removal.

Stripping of the iron from the organic reagent is accomplished by treatment of the organic solution with a mineral acid, such as sulfuric, hydrochloric, or hydrofluoric acid. The acid concentration may range from about 10% to about 40%, but 15%–30% by weight is preferable.

The optimum concentration for $H_2SO_4$ is 30%, and for HCl is 15%. The amount of acid employed is such that the phase ratio (volume of acid to volume of organic phase) is between about 0.5:1 and about 1.5:1, preferably about 1:1, at the preferred concentration of the stripping acids. The stripping temperature is advantageously between ambient temperature and about 100° C., preferably about 60° C. Stripping time may vary widely, but generally about 10 minutes is suitable. While up to 90% of the stripping is accomplished by a single cycle treatment, two or three stripping cycles may be employed to increase stripping efficiency, up to as high as 98–99%.

The nitric acid extract containing the alumina in the form of aluminum nitrate, and now low in silica and iron, may be treated further to reduce its potash (and soda) content, or it may be subjected to crystallization and calcination of the aluminum nitrate to produce alumina, in accordance with conventional procedures.

Thus, potash content of the alumina may be lowered from about 0.3% to 0.03% $K_2O$ or less by leaching the intermediate phase formed at about 550° C. during the decomposition of the aluminum nitrate to alumina. Alternatively, the potash content may be lowered by controlled crystallization of aluminum nitrate nonahydrate from the extraction liquor. In both methods, the $Na_2O$ content is lowered to about 0.03% at the same time.

The method involving partial calcination of the aluminum nitrate, followed by leaching with water to remove potash and soda may be carried out by known procedures, such as, for example, those disclosed in U.S. Patents 2,478,675, 2,769,688, and 2,774,744. In the method of the present invention, it has been found preferable to calcine the aluminum nitrate at about 550° C. for about 3 hours, followed by leaching with water at a temperature of about 95° C. for about 3 hours. The partial calcination removes most of the nitric acid, leaving a poorly crystallized alumina analyzing 80 to 95% $Al_2O_3$ by weight. The calcination is then continued at about 100° C. until conversion to alumina is complete. The nitric acid vapors evolved during the calcination steps are treated in conventional manner to produce nitric acid which is then recycled to the digestion step.

The invention is illustrated by the following examples, which are not, however, to be regarded as limiting:

EXAMPLE 1

*Preparation of calcined clay*

100 lbs. of Georgia kaolin analyzing: $SiO_2$ 44.2%, $Al_2O_3$ 37.4%, $Fe_2O_3$ 2.8%, loss on ignition 13.5%, was made into a paste with 30% by weight of water, and the paste was spread on a flat glazed porcelain plate and scored to yield cubic shapes. The plate and scored paste were dried at 120° C. for about 20 minutes, or until dry. The dried clay cake was removed from the plate by scraping, breaking up at the same time into individual cubes, about 1/16" in size. The cubic pellets were calcined in a hot muffle furnace, at a temperature of 450°–500° C., and the temperature was raised rapidly to 800° C. where the pellets were held for 1 hour. There was obtained a calcined clay residue in which the pellets retained their cubic shape, and which amounted to 87 lbs., analyzing 50.9% $SiO_2$, 43.0% $Al_2O_3$, and 3.2% $Fe_2O_3$.

EXAMPLE 2

*Nitric acid extraction of clay (recycled nitric acid)*

The 87 lbs. of calcined clay obtained as described in Example 1, was subjected to extraction for five minutes at a temperature of 120–125° C. under reflux with 357 lbs. of 50.5% nitric acid leach liquor, which had been prepared by adding fresh nitric acid to recycled nitric acid containing some aluminum nitrate. There was obtained 337 lbs. of extract liquor, containing 148 lbs. of $Al(NO_3)_3$ and 20.7 lbs. of $HNO_3$, and 109 lbs. of extraction residue with entrained liquor.

EXAMPLE 3

*Nitric acid extraction of clay (fresh nitric acid)*

40 grams of calcined clay pellets prepared as in Example 1 were placed in a glass flask and digested for 30 minutes under reflux with 123.8 grams of 50.5% nitric acid, the charge being held at a moderate boil throughout the extraction period, and at atomspheric pressure. There were obtained 95 grams of a solution of $Al(NO_3)_3$ in nitric acid, which were recovered by decantation and draining the residue, which retained its cubic shape during the digestion.

To remove the slight trace of residue, the acid liquor was filtered through an asbestos mat supported on a fritted glass filter. The filtrate contained 9.54% $Al_2O_3$ (corresponding to 39.8% $Al(NO_3)_3$ and had a content on an $Al_2O_3$ basis, of 0.013% $SiO_2$ and 1.70% $Fe_2O_3$.

EXAMPLE 4

*Nitric acid wash of extraction residue (with 50.5% $HNO_3$)*

The 109 lbs. of extraction residue with contained liquor obtained in Example 2, representing about equal parts of clay and liquor, and containing 26.2 lbs. $Al(NO_3)_3$ and 3.0 lbs. $HNO_3$, were washed in an acid resistant vessel with 302 lbs. of 50.5% nitric acid. The acid washings were recycled to the extraction operation. The residue from washing comprised 54 lbs. of clay mud and 55 lbs. of 50.5% nitric acid, and was free from $Al(NO_3)_3$.

EXAMPLE 5

*Nitric acid wash of extraction residue (with 70% $HNO_3$)*

57.0 grams of clay extraction residue containing the entrained liquor from the processing in Example 3, were treated with 45.0 grams of 70% $HNO_3$ for 2 minutes under reflux boiling at atmospheric pressure. There was obtained 45 grams of acid wash, which was combined with the extract liquor of Example 3, giving 150 grams of extracted liquor which contained 0.014% $SiO_2$ on an alumina basis. The residue was free from $Al(NO_3)_3$.

EXAMPLE 6

*Nitric acid recovery from washed residue*

109 lbs. of clay residue and entrained nitric acid wash liquor from Example 4, and composed of 54 lbs. of clay residue and 55 lbs. of 50.5% nitric acid, was heated in and acid-proof still at 130°–150° C. until all nitric acid had distilled off, leaving a residue of 54 lbs. of solid clay. The nitric acid distilled off was condensed and after fortification with fresh nitric acid, was recycled to the digestion step.

EXAMPLE 7

*Nitric acid recovery from washed residue*

57 grams of clay residue from Example 5 containing entrained acid wash liquor were heated and the nitric acid distilled off and condensed. This separation yielded 26.0 grams of nitric acid and 29.1 grams of dried clay residue, representing about 99% recovery of the nitric acid.

EXAMPLE 8

*Iron removal from extract liquor*

337 lbs. of extract liquor obtained as in Example 2, and containing 148 lbs. $Al(NO_3)_3$, 20.7 lbs. $HNO_3$, 0.656 lbs. $Fe_2O_3$, and 0.004 lbs. $SiO_2$, were extracted for 10 minutes at a temperature of 60° C. with a solution of 63.4 lbs. di-(2-ethylhexyl) hydrogen phosphate in 29.4 gallons of kerosene, using a phase ratio of organic liquor to acid liquor of 0.6:1. There was obtained 337 lbs. of a solution of $Al(NO_3)_3$ low in iron, in which the iron content expressed as $Fe_2O_3$ had been reduced from the figure of 0.656 lb., to 0.002 lb. The kerosene solution containing the ferric nitrate (0.654 lb. $Fe_2O_3$ was subjected to a stripping operation by heating it for 10 minutes at 60° C. with 88 gals. of 15% HCl, in 3 cycles. There were obtained 2.20 lbs. of $FeCl_3.6H_2O$.

EXAMPLE 9

*Iron removal from extract liquor*

50 grams of aluminium nitrate extract obtained as in Example 3 and containing 6.4% $Al_2O_3$ and 1.5% $Fe_2O_3$ on an alumina basis, were extracted with 6.44 grams of di-(2-ethylhexyl) hydrogen phosphate dissolved in 50 ml. of n-octane. The extract contained 0.016% $Fe_2O_3$ on an alumina basis.

EXAMPLE 10

*Alumina recovery from purified $Al(NO_3)_3$*

The 337 lbs. of low iron aluminum nitrate solution obtained as in Example 8 were evaporated to crystallize aluminum nitrate nonahydrate, which was heated at 400° C. to distill off nitric acid, which was returned to the nitric acid wash system. The partially decomposed aluminum nitrate was washed with 10 lbs. of water to remove potash and soda (as nitrates) and the washed residue further calcined at about 1000° C. to yield 35.5 lbs. of alumina, containing 0.006% $Fe_2O_3$ and 0.011% $SiO_2$.

While present preferred embodiments of the invention have been illustrated and described, it will be recognized that the invention may be otherwise variously embodied and practiced within the scope of the following claims.

What is claimed is:

1. Process for the treatment of silica-containing aluminous raw material to produce alumina having a silica content no greater than about 0.02% by weight, comprising the steps of calcining an aluminous raw material at a temperature between about 650° C. and about 850° C., extracting the calcined material with nitric acid having a concentration between about 46% and about 70% $HNO_3$ by weight, to minimize extraction of silica therefrom at a temperature corresponding to the boiling range of the nitric acid at the pressure used for digestion, separating the acid extract containing the alumina as aluminum nitrate from the acid insoluble residue, washing said residue with nitric acid having a concentration between about 50% and about 70% $HNO_3$ by weight to minimize solution of silica therefrom, combining the acid washings with the original acid extract, recovering the aluminum nitrate in the acidic combined extract and washings, and decomposing the aluminum nitrate to form alumina.

2. The process of claim 1 in which the concentration of nitric acid used for extraction is 50.5% $HNO_3$ by weight.

3. The process of claim 1 in which the aluminous raw material is clay.

4. The process of claim 1 in which the extraction with nitric acid is carried out at a temperature between about 115° and about 130° C. at atmospheric pressure.

5. Process for the treatment of silica-containing aluminous raw material to produce alumina having a silica content no greater than about 0.02% by weight, comprising the steps of calcining an aluminous raw material at a temperature between about 650° C. and about 850° C., extracting the calcined material with nitric acid having a concentration between about 46% and about 70% $HNO_3$ by weight, to minimize extraction of silica therefrom at a temperature corresponding to the boiling range of the nitric acid at the pressure used for digestion, separating the acid extract containing the alumina as aluminum nitrate from the acid insoluble residue, washing said residue with nitric acid having a concentration between about 50% and about 70% $HNO_3$ by weight to minimize solution of silica therefrom, combining the acid washings with the original acid extract, heating the washed residue at a temperature higher than the boiling point of the nitric acid used for washing to recover nitric acid therefrom, recycling the recovered nitric acid to further washing steps, recovering the aluminum nitrate in the acidic combined extract and washings, and decomposing the aluminum nitrate to form alumina.

6. Process for the production of alumina having a silica content no greater than 0.02% silica by weight and an iron content no greater than 0.03% $Fe_2O_3$ by weight, from a silica-containing aluminous raw material, comprising the steps of pelletizing said raw material and calcining the pellets at a temperature between about 650° and 850° C., extracting the calcined material with nitric acid having a concentration between about 46% and about 70% $HNO_3$ by weight, to minimize extraction of silica therefrom at a temperature corresponding to the boiling range of the nitric acid at the pressure used for digestion, separating the acid extract containing the alumina as aluminum nitrate from the acid insoluble residue, washing said residue with nitric acid having a concentration between about 50% and about 70% $HNO_3$ by weight to minimize solution of silica therefrom, combining the acid washings with the original acid extract, extracting said acidic combined washings and nitric acid solution with a solution in an organic solvent of a lower dialkyl ester of orthophosphoric acid capable of forming a complex with the iron present, separating the iron complex solution, recovering the aluminum nitrate in the extracted aluminum nitrate solution, and decomposing the aluminum nitrate to form alumina.

7. The process of claim 6 in which the organic extractant is a solution of di-(2-ethylhexyl) hydrogen phosphate in an aliphatic hydrocarbon solvent.

8. Process for the production of alumina having a silica content no greater than 0.02% silica by weight and an iron content no greater than 0.03% $Fe_2O_3$ by weight, from clay, comprising the steps of forming clay into small pellets, calcining said clay pellets at a temperature between about 700° and about 800° C., extracting the calcined clay with nitric acid having a concentration between about 46% and about 70% $HNO_3$ by weight, to minimize extraction of silica therefrom at a temperature corresponding to the boiling range of the nitric acid at the pressure use for digestion, separating the acid extract containing the alumina as aluminum nitrate from the acid insoluble residue, washing said residue with nitric acid having a concentration between about 50% and about 70% $HNO_3$ by weight to minimize solution of silica therefrom, combining the acid washings with the original acid extract, extracting said acidic combined washings and nitric acid solution with a solution in an aliphatic hydrocarbon solvent of a lower dialkyl ester of orthophosphoric acid capable of forming a complex with the iron present, separating the iron complex solution, recovering the aluminum nitrate in the extracted aluminum nitrate solution, and decomposing the aluminum nitrate to form alumina.

9. The process of claim 8 in which the organic extractant is a solution of di(2-ethylhexyl) hydrogen phosphate in kerosene.

10. The process of claim 8 in which the molar ratio of dialkyl phosphoric acid ester to iron present in the acid liquor is between about 3:1 and 6:1.

11. The process of claim 8 in which the ratio of organic extractant phase to aqueous acid phase is between about 0.5:1 and 0.8:1.

12. Process for the production of alumina having a silica content no greater than 0.02% silica by weight and an iron content no greater than 0.03% $Fe_2O_3$ by weight, from clay, comprising the steps of pelletizing the clay and calcining the clay pellets at a temperature between about 700° and 800° C., extracting said calcined clay with nitric acid having a concentration about 50.5% $HNO_3$ by weight, to minimize extraction of silica therefrom at a temperature between about 115° and about 130° C., separating the acid extract containing the alumina as aluminum nitrate from the acid insoluble residue, washing said residue with nitric acid having a concentration about 68% $HNO_3$ by weight to minimize solution of silica therefrom, heating the washed residue at a temperature higher than the boiling point of the nitric acid used for washing to recover nitric acid therefrom, combining the aforesaid acid washings with the original acid extract, extracting said combined washings and nitric acid solution with a solution of di(2-ethylhexyl) hydrogen phosphate in an aliphatic hydrocarbon solvent to remove iron by forming a complex therewith, separating the iron complex solution from the aqueous acid solution, recovering aluminum nitrate from the aqueous acid solution by evaporation, partially decomposing the aluminum nitrate by calcining at about 550° C. for about three hours, washing the calcined aluminum nitrate with water to remove potash and soda, and continuing the calcination at about 1000° C. until conversion to alumina is complete.

(References on following page)

References Cited by the Examiner

UNITED STATES PATENTS

| | | | |
|---|---|---|---|
| 2,019,553 | 11/1935 | Willmore | 23—141 |
| 2,019,554 | 11/1935 | Derr | 23—143 |
| 2,249,761 | 7/1941 | Hixson et al. | 23—143 X |
| 2,376,696 | 5/1945 | Hixson et al. | 23—143 |
| 2,476,979 | 7/1949 | Hoeman | 23—143 X |
| 2,817,578 | 12/1957 | Milliken | 23—143 X |
| 2,847,279 | 8/1958 | Tucker | 23—102 |
| 2,860,031 | 11/1958 | Gunsted | 23—23 X |

MAURICE A. BRINDISI, *Primary Examiner.*